United States Patent Office 3,684,451
Patented Aug. 15, 1972

3,684,451
METHOD FOR DETERMINATION OF
COUPLING COMPOUNDS
Gianni Linoli, Pully-la Rosiaz, Lausanne, and Enzo Sergio Mannucci, Lausanne, Switzerland, assignors to Miles Laboratories, Inc., Elkhart, Ind.
No Drawing. Original application June 23, 1966, Ser. No. 559,754. Divided and this application Aug. 20, 1969, Ser. No. 870,904
Int. Cl. C07g 7/02; C08f 27/08; G01n 31/00
U.S. Cl. 23—230 R
2 Claims

ABSTRACT OF THE DISCLOSURE

A novel insoluble polymeric diazonium salt color developer consisting of a diazotized aromatic polyamine bound by an amide linkage to a cation exchange resin can be prepared by reacting a cation exchange resin containing acid groups with a halogenating agent to convert some of the resin acid groups to acyl halide groups, reacting the resulting acyl halide groups with an aromatic polyamine to form a resin containing amide linkages and free aromatic amino groups, and then diazotizing the free aromatic amino groups. The resulting insoluble color developer can be used to detect coupling compounds by forming colored reaction products with such coupling compounds. This color developer can also be used to detect an enzyme system wherein the enzyme catalyzes a reaction with a suitable substrate to release a coupling compound which will form a colored reaction product with the insoluble color developer.

---

This is a division of application Ser. No. 559,754, filed June 23, 1966 now abandoned.

This invention relates to the determination of coupling compounds. In one of its more particular aspects, this invention relates to the determination of aromatic hydroxyl and amino compounds and other compounds which undergo a visible change in coupling reactions with diazonium salts.

A number of methods for determining coupling compounds are available. These include both instrumental and chemical methods. In general, the instrumental methods are too complex to be used except by those who have had formal training in the use of them. Most chemical methods also require a relatively high degree of skill.

One of the most popular chemical methods for the determination of this class of compounds is that involving the coupling of an aromatic diazonium salt with reactive coupling compounds such as, for instance, phenols or aromatic amines or compounds containing active methylene or active methyl groups.

Use of this method enables the determination of phenols or aromatic amines by simple colorimetric techniques. However, the diazonium reaction is one which must be conducted under carefully regulated conditions of temperature and pH, and so involves a correspondingly high level of care in successfully carrying out the reaction.

It is accordingly an object of this invention to provide a method for determining reactive coupling compounds which involves none of the shortcomings of the prior art.

It is another object of this invention to provide such a method which is convenient to use and which does not require a high level of training and skill in the operation of analytical instruments or the carrying out of complex chemical reactions.

Another object of this invention is to carry out the above mentioned determination in a very short time and without special equipment.

Another object of this invention is to provide a method for determining reactive coupling compounds when they are present in very low concentrations.

Other objects and advantages of this invention will become apparent in the course of the following detailed disclosure and description.

It has now been found that a convenient test for reactive coupling compounds can be provided by using an insoluble color developer. Such developer can be prepared by diazotizing a polymeric material containing free aromatic amino groups.

The most obvious method for providing free aromatic amino groups attached to a polymer backbone is by the nitration of benzenoid units attached to a polymer such as a polystyrene, followed by reduction of the resulting nitro groups to amino groups. The aromatic amino groups resulting can then be readily diazotized by treatment with nitrous acid or other diazotizing agent usually by reaction with a dilute solution of sodium nitrite and an acid such as hydrochloric acid. This method is disclosed in U.S. Pat. No. 2,274,551 to William O. Kenyon, Louis M. Minsk and George P. Waugh. This latter method, however, is subject to the disadvantage that the nitration step, which involves the use of an oxidizing agent, causes a discoloration of the products which does not disappear completely upon reduction and subsequent disazotization. In contrast thereto the method of the present invention does not involve the use of oxidizing agents and results in the provision of polymeric diazonium salts of the same color as the amine from which they derive. These salts are capable of effective utilization as insoluble color developers.

In order to provide such polymeric diazonium salts, one starts with a polymeric material which contains acid groups such as carboxylic, sulfonic or phosphoric acid groups. Such materials are commercially available in the form of a wide variety of cationic ion exchange resins. These resins can be reacted with a halogenating agent, for example, a thionyl halide such as $SOCl_2$, or a phosphorus halide such as $PCl_3$ or $PCl_5$. Alternatively, sodium or potassium salts of such resins can be reacted with $POCl_3$ or $SO_2Cl_2$. For example, in the case of a carboxylic acid cation exchange resin, reaction with thionyl chloride produces the acyl chloride of the resin as shown in the following equation:

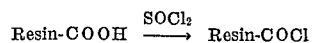
$$\text{Resin-COOH} \xrightarrow{SOCl_2} \text{Resin-COCl}$$

The resin halide can then be reacted with a carbocyclic aromatic diamine in water or in an anhydrous organic solvent in order to provide a resin amide in which one aromatic amino group remains free. For example, using such carbocyclic aromatic diamines as benzidine, o-tolidine, o-dianisidine, the phenylenediamines (ortho, meta or para), the resin halide is converted to a resin amide which contains a free aromatic amino group in accordance with the following equation:

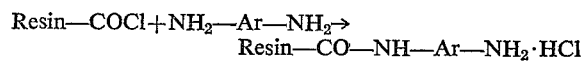
Resin—COCl+$NH_2$—Ar—$NH_2$→
Resin—CO—NH—Ar—$NH_2$·HCl wherein Ar represents the aromatic nucleus to which the two amino groups shown are attached. Such aromatic nucleus may be monocyclic, that is benzenoid, or polycyclic as in the case of derivatives of naphthalene, biphenyl, anthracene or phenanthrene.

The resulting resin amide containing a free aromatic amino group can be diazotized to produce resin diazonium salts which can react with coupling compounds to give colored azo products.

The diazotization can be performed, for example, by reacting the resin amide with sodium nitrite in the presence of an acid such as hydrochloric, sulfuric, phosphoric or fluoboric acid, resulting in the formation of a polymeric diazonium salt. This diazonium salt is highly insoluble because of its polymeric nature and stable because of the presence in the resin of unreacted acid groups. This reaction can be illustrated as follows:

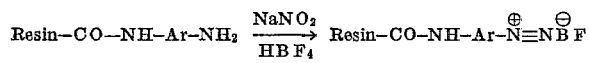

These polymeric diazonium salts can be stored for extended periods of time and used in aqueous solution to test for any compound which will couple with them. In particular these polymeric diazonium salts are useful as insoluble color developers in the analysis of aromatic hydroxyl and amino compounds and other compounds which couple with diazonium salts to produce azo derivatives which are highly colored.

This coupling reaction can be illustrated with α-naphthol or β-naphthol by means of the following equation:

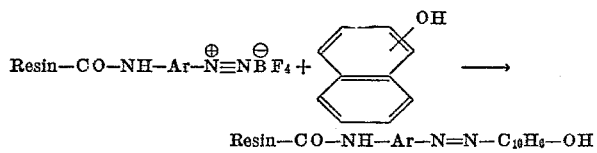

The polymeric diazonium salts of this invention react with a wide number of coupling compounds such as aromatic amines, phenols and naphthols, naphthoic acid derivatives, nitro derivatives of amines and phenols, nitroparaffins, substances with reactive methylene and methyl groups such as acetoacetic esters, β-oxo glutaric acid or 5-pyrazolone derivatives, sulfonic acid derivatives of phenol and naphthol and sulfonic acid derivatives of aromatic amines.

The coupling reaction to form the colored azo compound is generally a quantitative one, that is, a certain amount of polymeric diazonium salt will react with a fixed amount of a coupling compound under suitable conditions. Owing to this the polymeric diazonium salts of this invention can be used as insoluble color developers for quantitative or semi-quantitative determination of coupling compounds in several ways.

These insoluble color developers are particularly useful when used in reagent strips. For instance, the insoluble color developer can be coated upon sheets of a bibulous cellulosic material, such as filter paper to provide sheets containing zones of color developer.

Rather than merely coating cellulosic sheets, an especially convenient and elegant method involves the formation of fibrous color developer sheets from an aqueous homogenized mixture of insoluble color developer and cellulosic fibrous material. These filtrous color developer sheets can then be used to prepare strips or discs of color developer.

The insoluble color developers of this invention can also be used in the form of tablets which can be prepared by mixing the insoluble color developer with suitable tabletting materials, for example, powdered cellulose and the like.

Strips can be either of a continuous or discontinuous type, that is, the areas containing color developer may be continuous or alternated with inert areas. For instance, continuous strips can be formed by a whole reactive zone fixed to a support such as paper, cardboard, wood, glass fiber or plastic. Graduated scales referring to quantities of the product to be determined can be imprinted upon such support. In the discontinuous type, the reactive zones are alternated with non-reactive zones.

For testing, when strips are used, an ascending or descending chromatographic technique is adopted. A predetermined amount of solution to be tested for the coupling compound is absorbed into the strips and the strips are then washed with water. The coupling compound, in contact with the insoluble color developer, generates a color. Since the coupling reaction is a quantitative one, the color intensity will be determined by the chemical composition of the reactive area, that is, by the amount of insoluble color developer present in the strip, while the extension of the colored area, measured by means of the previously mentioned imprinted graduations, will be proportional to the amount of the coupling compound coming into contact with the reactive zone.

Coupling product concentration can be determined in the one zone continuous strip by means of the previously mentioned imprinted graduations. In the discontinuous type multiple zone strip the number of the zones in which a color is developed will indicate the concentration of the coupling compound being determined. For example, by using a series of three zones containing the color developer fixed to a bibulous carrier, it is possible to determine the amount of coupling compounds present by the extent to which the advancing solvent front of the test medium carries the coupling compound along the strip. That is, a lesser concentration of coupling compound may react with the color developer present in the first zone but not with that present in the second or third zone. A somewhat higher concentration may react with that present in the first two zones and a still higher concentration with that present in all three zones.

When discs are used, a pre-determined amount of the liquid under examination is absorbed into the disc. The reaction between the color developer and any coupling compound present takes place in the disc and a color, the intensity of which is proportional to the amount of coupling compound present, is developed. The color obtained is compared with a suitable color chart and the amount of coupling compound present in the solution under examination is determined. Tablets are used in a similar manner.

In addition to using the insoluble color developer of this invention to detect reactive coupling compounds, it is also possible to detect systems which are capable of producing reactive coupling compounds. Since a wide variety of enzyme systems are capable of catalyzing the liberation of coupling compounds by their precursors, these systems can be readily detected by using the insoluble color developer of this invention together with an appropriate coupling compound precursor as a substrate for the enzyme to be detected. Representative examples of these enzymatic reactions are the following:

(a) lipase: the substrate used can be naphthyl laurate, myristate or capyrylate. Lipase hydrolyses the substrate liberating the naphthol which is the specific compound to be determined.

(b) acetyl esterase: the substrate used can be acetyl naphthol or acetyl naphthylamine. The enzymatic hydrolysis libreates naphthol or naphthylamine which are reactive coupling compounds.

(c) N-acetylbetaglucosaminidase: using as substrate naphthyl-β-acetylglucosamine the enzymatic reaction releases naphthol.

(d) transaminase (GOT): in GOT transaminations L - glutamate+α - oxalacetate are formed from L-aspartate+α-oxo-glutarate. The α-oxalacetate formed in this reaction can be determined by means of the insoluble color developers of this invention because its active methylene group reacts with diazonium salts.

(e) leucine aminopeptidase: using L-leucyl-β-naphthylamide as a substrate, the enzymatic reaction liberates β-naphthylamine.

(f) acid and basic phosphatases: the various phosphatases catalyze the hydrolysis of aromatic phosphates to the corresponding aromatic hydroxyl compounds which can then be readily detected by means of the color developer of this invention.

Many convenient methods can be used for detecting these systems. For example, a suitable substrate for such enzyme system can be impregnated into one zone of a bibulous carrier to which is joined a zone of color developer. When the substrate zone is moistened with a solution containing a phosphatase, the enzymatic reaction proceeds resulting in the release of an aromatic hydroxyl compound. Washing with water brings the latter into contact with the insoluble color developer in the adjacent zone giving a color.

Another convenient method of using the insoluble color developer of this invention for the detection of an enzyme system provides the enzyme substrate in a tablet form which can be added to the solution which is being tested for the presence of the enzyme. The color developer in the form of a bibulous strip or tablet can then be moistened with the resulting solution to cause the desired color reaction to occur if the enzyme is present. Such a test method is convenient, for example, for testing milk for the presence of phosphatases in order to check the pasteurization. It is well known that pasteurization temporarily destroys phosphatase in milk and that the presence of phosphatase in pasteurized milk soon after pasteurization is a sign of inadequate pasteurizing temperature or of the presence of raw milk.

This invention will be better understood by reference to the following examples which are intended as illustrative of the inventive concept and are not to be construed so as to limit the scope of the invention which is defined in the claims appended hereto.

EXAMPLE 1

A polymethacrylic cation exchange resin (Amberlite IRP 64 type), in the carboxylic form, was milled into a fine powder (particle size varying in the range of 20–50 microns) and dried. Fifty grams (50 g.) of the obtained powder were refluxed in 200 ml. of thionyl chloride under stirring for 6 hours. The reaction mixture was then filtered and the resulting chlorinated resin washed with anhydrous toluene and dried in high vacuum. The so obtained chlorinated resin contained 0.98 meq. of —COCl per gram.

EXAMPLE 2

The above mentioned fine form of resin, having a particle size of 20–50 microns, was chlorinated under the same conditions for 3 hours. The resulting chlorinated resin contained 0.66 meq. COCl per gram.

EXAMPLE 3

The already mentioned fine form of resin, having a particle size of 20–50 microns, was chlorinated under the same conditions for 9 hours and the resin contained 1.4 meq. —COCl per gram.

EXAMPLE 4

A polymethacrylic cation exchange resin (Amberlite IRP 64 type), in the acid form, was reduced, by milling, to a fine powder (particle size 1–5 microns), then dried. Chlorination took place according to the procedure indicated in Example 1 for the duration of 3 hours. The resulting chlorinated resin contained 0.84 meq. COCl per gram.

EXAMPLE 5

A polymethacrylic cation exchange resin (Amberlite IRP 64 type) was changed into the sodium salt and reduced by milling to a fine powder (particle size varying from 50 to 70 microns) and then dried. A quantity of 50 g. of resin sodium salt was refluxed for 6 hours in 100 ml. of anhydrous carbon tetrachloride and 100 ml. of sulfuryl chloride. The resin was filtered and washed with carbon tetrachloride and then dried. The resulting chlorinated resin contained 0.56 meq. of —COCl per gram.

EXAMPLE 6

A quantity of 10 g. of chlorinated resin prepared according to the procedure of Example 1 was poured into a solution of o-dianisidine (3.3 g.) in 75 ml. of dry toluene. The resulting suspension was heated at 85° C. for 5 hours with stirring. The mixture was filtered and the resin was washed in batch with ethanol (100 ml.) from which it was possible to recover the excess of unreacted amine. The resin was then put into a chromatographic column and washed with 2 N $HBF_4$ (200 ml.) and then with water at the neutral point of effluent liquid. The resulting resin acylated amine, analyzed for diazotizable nitrogen, showed 47 mg. of mono-linked o-dianisidine per gram.

EXAMPLE 7

A quantity of 10 g. of chlorinated resin prepared according to Example 1 was poured into a solution of o-dianisidine (3.3 g.) and triethylamine (10 g.) in 75 ml. of dry toluene. The resulting suspension was heated at 85° C. for 6 hours with stirring. The resin was washed according to Example 6 and then dried. In the resulting resin acylated amine, analyzed for diazotizable nitrogen, 61 mg. of mono-linked o-dianisidine per gram were present.

EXAMPLE 8

A solution of o-dianisidine dihydrochloride (4.3 g.) in 200 ml. of water was refrigerated at a temperature of 0.5° C. To this solution a quantity of 10 g. of the chlorinated resin from Example 1 was added. Stirring and refrigeration were continued while 30 ml. of 20% NaOH was slowly added up to a pH value of 11–12. After 14 hours of stirring and refrigerating, the suspension was centrifuged and the precipitate washed with methanol. The washings were saved for the subsequent recovery of unreacted amine. The resin was then washed with $HBF_4$ and dried according to Example 6. The resulting resin acylated amine, analyzed for diazotizable nitrogen, showed a quantity of 7.20 mg. of mono-linked o-dianisidine per gram.

EXAMPLE 9

A solution of m-phenylenediamine·2HCl (1.8 g.) in 50 ml. of water was refrigerated at a temperature of 0–5° C. To this solution a quantity of 10 g. of the chlorinated resin prepared as in Example 1 was added and 24 ml. of 20% NaOH were slowly added up to a pH value of 11–12, while the mixture was stirred and refrigerated. After 14 hours, the resin was filtered off and washed according to Example 8. When analyzed, the resulting resin acylated amine showed 15.9 mg. of mono-linked m-phenylenediamine per gram.

EXAMPLE 10

A quantity of 10 g. of chlorinated resin prepared according to Example 3 was poured into a solution of o-dianisidine (5.25 g.) in 75 ml. of dry toluene heated to 80° C. The obtained suspension was heated to 80° C. for 14 hours. After this time the suspension was filtered and the resulting resin washed as in Example 8. The resin acylated amine so obtained showed an amount of 63 mg. mono-linked o-dianisidine.

EXAMPLE 11

An amount of 10 g. of chlorinated resin obtained as in Example 3 and a quantity of 5.95 g. of o-tolidine dihydrochloride were reacted according to the conditions reported in Example 9. The resulting resin acylated amine contained 11.8 mg. of mono-linked o-tolidine per gram.

EXAMPLE 12

A quantity of 10 g. of chlorinated resin obtained as in Example 3 and an amount of 5.3 g. benzidine dihydrochloride were reacted according to the conditions in Example 9. The obtained resin acylated amine contained 45 mg. of mono-linked-benzidine per gram.

EXAMPLE 13

A quantity of 3 g. of the resin acylated amine of Example 6 was suspended in 10 ml. of 3 N $HBF_4$ and cooled at a temperature of 0–5° C. The resulting suspension was stirred while adding dropwise 10 ml. of 1 N $NaNO_2$. Stirring was continued and the temperature maintained for 4 hours. The mixture was then centrifuged and the isolated resin acylated amine diazonium salt,

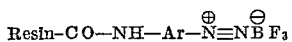

was dried in a vacuum. This procedure could be extended to all resin acylated amines prepared according to the Examples 6–12 which refer to resin acylated amines.

EXAMPLE 14

Resin acylated amine diazonium salts were reacted with α-naphthol in order to determine the coupling activity and to observe the developed color. The results using resin acylated amine diazonium salts prepared from each of the resin acylated amines of Examples 6–12 are shown in Table 1.

TABLE 1

| Example | Amine resin type | α-Naphthol fixed, mg./g.[1] | Color developed |
|---|---|---|---|
| 6 | Resin-o-dianisidine | 27.21 | Medium purple-red. |
| 7 | do | 36.00 | Deep purple-red. |
| 8 | do | 4.25 | Light purple. |
| 9 | Resin-m-phenylenediamine | 21.4 | Orange. |
| 10 | Resin-o-dianisidine | 29.2 | Medium purple-red. |
| 11 | Resin-o-tolidine | 8.1 | Red. |
| 12 | Resin benzidine | 35.6 | Brick red. |

[1] Resin acylated diazonium salt.

EXAMPLE 15

A mixture of 8 g. of cellulose fiber (cut to a length of about 3 mm.) and 2 g. of

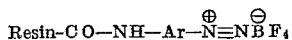

from Example 13 was homogenized in 5 l. of water at pH 3–4. The homogenized mixture was allowed to sediment and the cellulose resin layer which formed was pressed into a 25 cm. sheet, which possessed a diazo-coupling activity equal to ⅕ that of the original resin acylated amine diazonium salt.

EXAMPLE 16

Sheet material as per Example 15 was cut into strips 0.5 cm. wide and likewise non-reactive strips of the same size of Eaton-Dikeman 627–65 filter paper were prepared. The strips of the 2 different types of paper were assembled with glue to a plastic waterproof support in order to obtain a sheet having 3 reactive zones alternating with 2 non-reactive zones, the top and bottom part of the sheet being constituted by 2 strips of filter paper 3 cm. wide. The resulting sheet was cut into strips of 0.5 cm. each.

EXAMPLE 17

The sheet prepared according to the procedure of Example 15 was cut into 3 mm. x 30 mm. strips. These were glued to a plastic waterproof support having a graduated scale. At the top and bottom part of the support 2 strips of 3 mm. x 30 mm. filter paper were fixed.

EXAMPLE 18

Strips were prepared according to Examples 16 and 17 except that one 3 cm. filter paper end was replaced with glass fiber paper. This glass fiber end was dipped into a solution having the composition (per ml. of aqueous solution) shown in Table 2.

TABLE 2

| Ingredient: | Weight, mg. |
|---|---|
| Tris(hydroxymethyl)aminomethane | 200 |
| β- or α-naphthyl phosphate | 20 |
| Magnesium sulphate | 0.5 |
| pH=10.3. | |

The wet strips were dried in a vacuum.

EXAMPLE 19

The procedure of Example 18 was followed except that the composition shown in Table 3 was used.

TABLE 3

| Ingredient: | Weight, mg. |
|---|---|
| Sodium fumarate | 100 |
| β- or α-naphthyl phosphate | 20 |
| Magnesium sulphate | 0.5 |
| pH=5.05. | |

EXAMPLE 20

The sheet prepared according to Example 15 was glued to a plastic support and cut into disc form.

EXAMPLE 21

Tablets were prepared containing the ingredients shown in Table 4.

TABLE 4

| Ingredient: | Weight, mg. |
|---|---|
| Tri(hydroxymethyl)aminomethane | 18 |
| Starch | 2 |
| β- or α-naphthyl phosphate | 0.2 |
| Polyoxyethylene glycol | 2.8 |
| Magnesium sulphate | 0.05 |

The tablets were of a weight varying from 22–25 mg.

EXAMPLE 22

Tablets were prepared containing the ingredients shown in Table 5.

TABLE 5

| Ingredient: | Weight, mg. |
|---|---|
| Sodium fumarate | 10 |
| Starch | 1 |
| β- or α-naphthyl phosphate | 0.2 |
| Polyoxyethylene glycol | 1 |

The tablets were of a weight varying from 12–14 mg.

EXAMPLE 23

Into a suitable test tube were introduced a tablet prepared according to Example 21 and two drops of water. The tablets disintegrated in 10–15 seconds resulting in a turbid solution. A suspect pathologic serum to be analyzed was then added to the solution in the test tube in a quantity of 0.1 ml. and the tube shaken. After 10 minutes incubation at a temperature of 37° C., one drop of 10% orthophosphoric acid solution was added.

A three-zoned test strip prepared according to Example 16 was dipped into the above solution and after 5 minutes the developed color was observed to be a purple-red. All three zones had been invaded by the color indicating that the serum had a value of phosphatase activity of the highest level for which the three-zoned test strip was designed, that is, a pathologic value. A normal serum treated as above gave color only to the first of the three zones. If an unknown serum were to give color to the first and second zone it would be considered as borderline.

EXAMPLE 24

The continuous strip prepared according to Example 17 was introduced into the test solution of Example 23. Five minutes later the extension of colored area was observed and the number corresponding to the highest level of colored area on the calibrated strip was recorded. Figures from 1–3 indicated a normal value, from 3–5 a borderline value and higher figures indicated pathologic values.

EXAMPLE 25

Into a test tube were introduced a tablet prepared according to Example 21 and 3 drops of milk to be assayed. After 10 minutes a one-zone test strip prepared according to Example 17 was dipped into the resulting solution. Five minutes later the concentration of phosphatase was read based on the color development of the strip. Color development in adequately pasteurized milk, for example, should be limited to the figure 1 of the scale. Higher values indicate an inadequate pasteurization or the presence of adulterating raw milk.

EXAMPLE 26

A three-zone strip prepared according to Example 18 was moistened at the end part containing the substrate with 0.05 ml. of the serum to be assayed. After 10 minutes the strip was washed with water so that the liberated naphthol reached the developer zone. Five minutes later the concentration of phosphatase was read as described in Example 23.

EXAMPLE 27

A one-zone strip prepared according to Example 18 was moistened at the end part containing the substrate with 0.05 ml. of the milk to be assayed. After 10 minutes the strip was washed with water so that the liberated naphthol reached the developer zone. Five minutes later the concentration of phosphatase was read as described in Example 25.

In summary this invention provides an insoluble polymeric diazonium salt color developer which can be used in the determination of coupling compounds and related enzyme systems.

What is claimed is:

1. A method for detecting a coupling compound which comprises adding to a liquid in which said coupling compound is to be detected an insoluble polymeric diazonium salt color developer comprising a diazotized aromatic polyamine bound by an amide linkage to a cation exchange resin having carboxylic acid reactive groups, and observing any color development due to diazo coupling between said polymeric diazonium salt color developer and any coupling compound which may be present.

2. A test device for use in the detection of a coupling compound which comprises a bibulous carrier containing an insoluble polymeric diazonium salt color developer comprising a diazotized aromatic polyamine bound by an amid linkage to a cation exchange resin having carboxylic acid reactive groups.

References Cited

UNITED STATES PATENTS

| | | | |
|---|---|---|---|
| 2,906,715 | 9/1959 | Hagge et al. | 260—2.1 |
| 3,230,087 | 1/1966 | Sus et al. | 260—141 X |
| 3,411,863 | 11/1968 | Guthrie et al. | |

JOSEPH SCOVRONEK, Primary Examiner

U.S. Cl. X.R.

23—231, 253 TP; 195—103.5; 260—2.2 R